United States Patent [19]

Levitin

[11] Patent Number: 5,125,393

[45] Date of Patent: Jun. 30, 1992

[54] STOVE TOP VESSEL WITH ENERGY CONSERVING CASING

[76] Inventor: Isaak Levitin, 5055 Collwood Blvd., #215, San Diego, Calif. 92115

[21] Appl. No.: 631,343

[22] Filed: Dec. 20, 1990

[51] Int. Cl.⁵ .................... F24H 1/00; A47J 27/12
[52] U.S. Cl. .................... 126/373; 126/390; 220/912; 220/608; 220/629; 220/657; 99/447
[58] Field of Search .......... 126/214 D, 359, 385, 126/373, 390; 220/912, 913, 608, 629, 657; 99/447

[56] References Cited

U.S. PATENT DOCUMENTS

| 1,438,792 | 12/1922 | Snyder . | |
|---|---|---|---|
| 1,758,571 | 5/1930 | Hager . | |
| 2,152,924 | 4/1939 | Rutenber | 126/275 |
| 3,799,048 | 3/1974 | Finley | 99/415 |
| 3,971,360 | 7/1976 | Spoeth, Jr. | 126/373 |
| 4,216,241 | 8/1980 | Thompson | 426/549 |
| 4,373,511 | 2/1983 | Miles et al. | 126/369 |
| 4,532,911 | 8/1985 | Orter | 126/373 X |
| 4,646,717 | 3/1987 | Baggioli | 126/373 |

Primary Examiner—Larry Jones
Attorney, Agent, or Firm—Brown, Martin Haller & McClain

[57] ABSTRACT

An energy conserving cooking or heating vessel assembly comprises an inner receptacle for receiving food or other materials to be cooked or heated and a cylindrical skirt or sleeve of larger diameter than the inner receptacle extending downwardly from a predetermined height on the side walls of the inner receptacle. The sleeve has an open lower end which is of larger diameter than a stove top recess for a gas burner or electric heating element, and the lower end is designed to rest on the flat surface of a stove top surrounding a burner or electric element recess to form an enclosed volume surrounding both the inner receptacle and the burner area below the inner receptacle. The skirt may be secured to the inner receptacle or may comprise a separate outer casing for receiving any conventional stove top vessel such as a saucepan or tea kettle.

21 Claims, 5 Drawing Sheets 5,125,393

STOVE TOP VESSEL WITH ENERGY CONSERVING CASING

BACKGROUND OF THE INVENTION

1. Field of the Invention

The present invention relates generally to cooking or other stove top vessels such as saucepans, frying pans, tea kettles, casserole dishes and the like as generally used for cooking or heating food or water on stove top gas or electric burners, and is particularly concerned with an energy conserving casing for such burners.

2. Description of Related Art

Typically a lot of energy is wasted in stove top cooking as a result of heat loss to the cold air surrounding both the cooking vessel and the burner. Some double walled cooking utensils have been proposed in the past for providing more uniform heating, such as those described in U.S. Pat. No. 1,758,571 of Hager and 2,152,924 of Rutenber. These structures are typically fairly complicated and do not have energy conservation as their main objective.

SUMMARY OF THE INVENTION

It is an object of the present invention to provide a new and improved energy conserving casing for a cooking vessel.

According to the present invention, an outer casing for a cooking vessel is provided, comprising a generally cylindrical sleeve of diameter larger than that of the cooking vessel for surrounding the side walls of the cooking vessel to leave an annular enclosed volume around the vessel, the sleeve having an open lower end around which a seating flange extends for seating on the upper surface of a stove top surrounding and spaced from a burner or electric element opening in the stove top. The sleeve includes a support for supporting a cooking vessel within the casing. The support may simply comprise an inwardly projecting rest for freely supporting a separate cooking vessel to be used with the casing, or may comprise a securing device for positively securing the casing to an inner cooking vessel. Preferably, the seating flange comprises an outwardly projecting flat rim or lip extending around the lower end of the sleeve.

In this way both the outer walls and base of the cooking vessel and the entire burner area are completely surrounded and insulated from exterior, cold air, significantly reducing heat loss and increasing cooking efficiency. The casing may be designed either for a gas stove or an electric stove, and for surrounding any standard stove top cooking vessel, from saucepans of any size to frying pans, with an enclosed volume or heating chamber. Where the casing is intended for use on a gas stove, it includes a transverse barrier extending across the open lower end of the casing at a location spaced above the seating flange and below the base of the inner cooking vessel, the barrier having a central opening for centering over a gas burner. Openings are provided around the periphery of the casing below the barrier for allowing air flow into the burner area. The partition prevents the flow of incoming cold air from mixing directly with the hot gas flowing from the burner around the surface of the vessel. Where the casing is for use on an electric stove, both the openings and the transverse barrier are omitted.

The casing produces a reserved, protected volume around the cooking vessel and the energy source, insulating them from the surrounding cold air and, at the same time, directing hot gas to flow over all surfaces of the cooking vessel to improve cooking efficiency. Heat loss will be reduced, and the temperature surrounding the cooking vessel will be correspondingly greater, significantly reducing cooking times. This will therefore save energy and reduce energy costs by a corresponding amount. It is believed that energy savings of 25 to 40% may be achieved by use of the energy conserving casing. The structure is simply and has a minimum of parts, making it relatively inexpensive to manufacture.

BRIEF DESCRIPTION OF THE DRAWINGS

The invention will be better understood from the following detailed description of some preferred embodiments, taken in conjunction with the accompanying drawings, in which like reference numerals refer to like parts, and in which.

DESCRIPTION OF THE PREFERRED EMBODIMENTS

Figure 1:
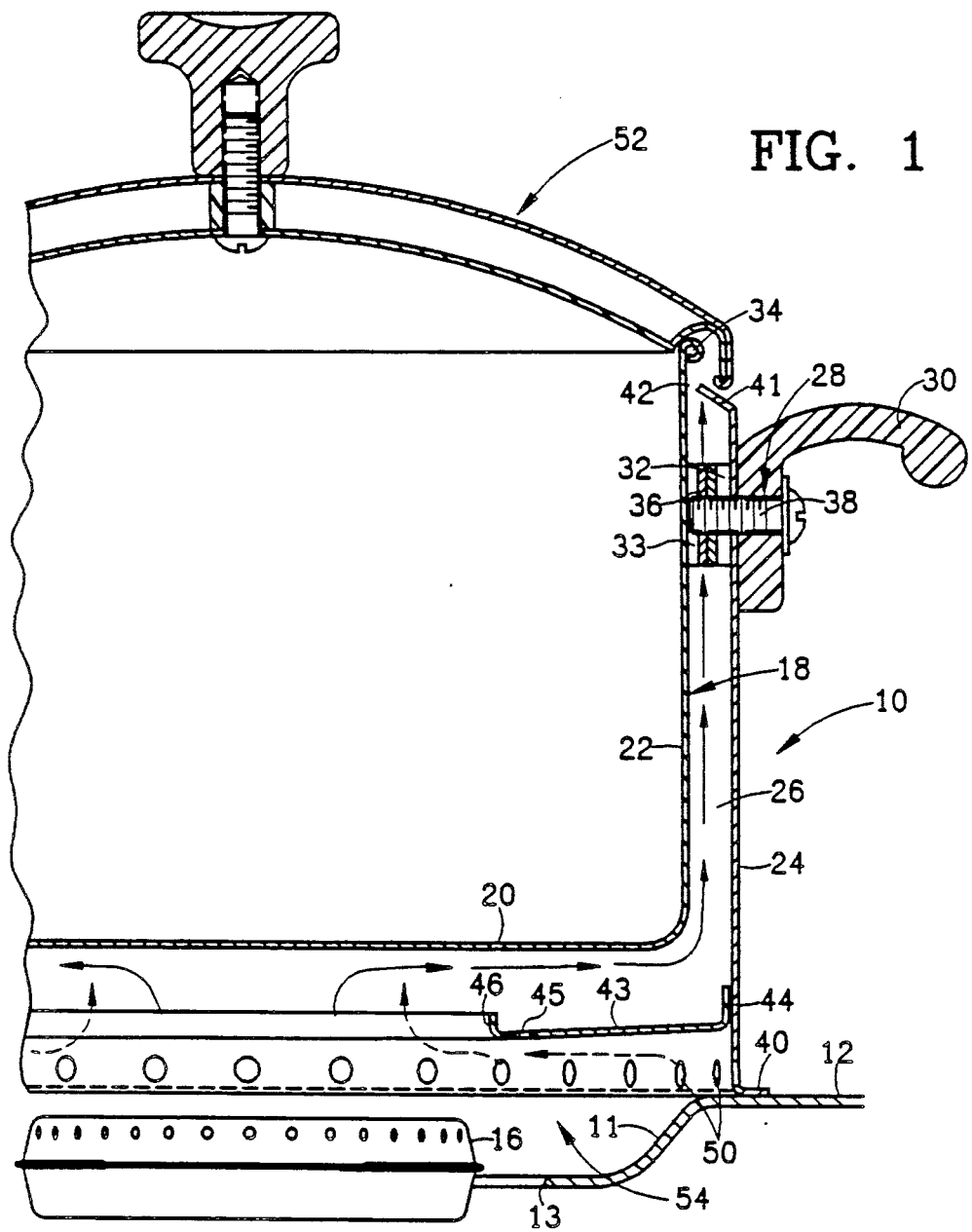
FIG. 1 is a vertical cross-sectional view, partially broken away, of a cooking vessel assembly with an energy conserving casing according to a first embodiment of the present invention.

FIG. 1 of the drawings illustrates an energy conserving cooking vessel assembly 10 according to a first embodiment of the present invention which is particularly intended for use on a gas stove having a plurality of burner recesses 11 in stove top 12, the recesses having openings 13 in which gas burner heads 16 are located.

The assembly 10 basically comprises an inner, cooking vessel or receptacle 18 having a base or bottom wall 20 and upstanding cylindrical side wall 22, and an outer cylindrical casing or sleeve 24 of larger diameter than the receptacle surrounding the side wall 22 to leave an annular gap or enclosed volume 26 between the outer surface of side wall 22 and the inner surface of the sleeve 24. The inner vessel 18 and outer sleeve 24 are secured together via screw connection 38 which also secures a suitable handle 30 to the outside of sleeve 24 at an appropriate height. Connection 28 may be of any suitable type, but in the embodiment illustrated a boss 32 is secured to the inner face of wall 24 close to its upper rim 41, the boss 32 having an opening 36 for receiving screw 38 which also secured the handle 30 in place as illustrated in FIG. 1, and extends into a screw threaded bore in a boss 33 on the side wall 22 of the cooking vessel. The positioning of screw 38 on sleeve 24 is such that the upper end of the sleeve is adjacent the upper end of the cooking receptacle, while the lower end of the sleeve projects downwardly below the base of receptacle 18. An outwardly projecting seating flange or lip 40 extends around the periphery of the open, lowermost end of the sleeve 24 for resting on the flat stove top 12 surrounding a burner recess. An inwardly projecting rim 41 is provided around the open upper end of the sleeve, with a small gap 42 between the inner end of the rim 41 and the adjacent outer surface of the inner receptacle for flow of hot gases out of the assembly.

A transverse barrier plate 43 extends across the open lower end of the sleeve at a location spaced below the base of the receptacle and above the lowermost end of the sleeve. The barrier plate is suitably secured by welding or the like around its outer periphery to the inner surface of the sleeve at the appropriate location, and has an upturned outer rim or flange 44 for this purpose. A small drainage hole 45 is provided in the plate, and the plate has a central opening 46 with an upturned peripheral rim or lip. The diameter of opening 46 is slightly larger than the diameter of the burner head 16, as illustrated.

The sleeve has a plurality of air inlet openings 50 spaced around its periphery at a position below the barrier plate 43 for access of air to the burner area. Preferably, the cooking vessel or receptacle has a lid 52 of conventional shape, which may be double walled as illustrated for insulation purposes.

With this assembly, the outer surface of the cooking vessel is completely insulated from the exterior, cold air via the surrounding outer casing or sleeve which forms a protected volume or chamber 26 and 54 extending around the cooking vessel and down to the stove top around the burner area, directing hot air in the direction of the arrows in FIG. 1 from the burner head 16 up through the barrier opening 46, outwardly between the barrier and base of the vessel, and upwardly between the casing and outer surface of the vessel, before flowing out via gap 42. Additionally, the actual gas stove burner area or recess is also protected from the surrounding cold air, since the casing projects down to and is seated on the upper surface of the gas stove itself surrounding the burner area. The resultant reserved volume 54 around the energy source or burner head will effectively increase the temperature of burning and the temperature of hot gas, allowing no hot gas to escape to the surrounding air but effectively directing all of the hot gases onto the surface of the cooking vessel. This will substantially reduce heat losses from the burner area and the cooking vessel itself, with a resultant reduction in the cooking time and consequent energy savings.

The holes in the lower end of the casing below the barrier plate provide sufficient air for combustion of the gas from the burner head. The barrier plate divides the flow of incoming cold air from the flow of hot gases from the burner head, substantially preventing the cold air from mixing with the hot gases. This also reduces loss of energy. Additionally, the barrier plate itself will be heated by the hot gases flowing over it, at the same time heating the incoming cold air prior to arrival at the burner for increased efficiency and reduction in any heat losses resulting from mixing with cold air.

Figure 2:
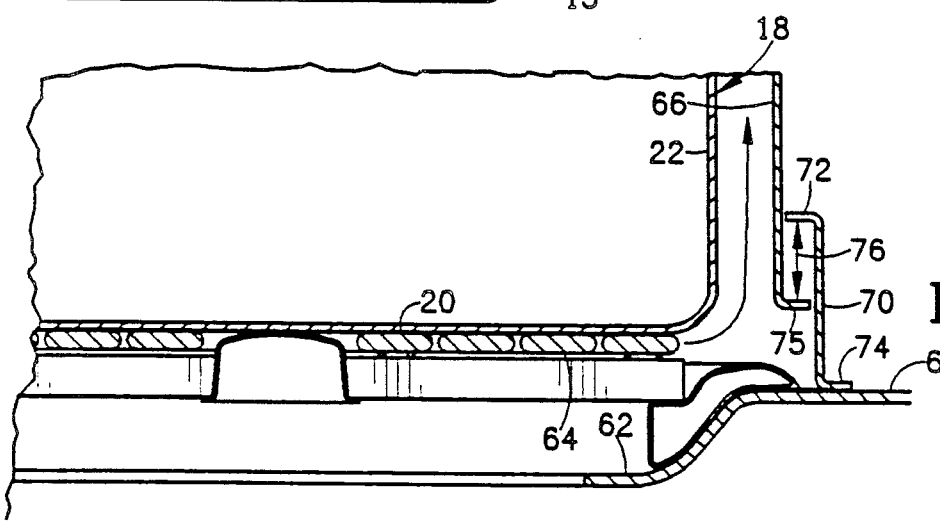
FIG. 2 is a view similar to FIG. 1 illustrating a modified assembly for use on an electric stove.

FIG. 2 of the drawings illustrates a modified cooking assembly for use on an electric stove having a stove top 60 with recesses 62 containing electric heating elements 64. The upper part of the cooking assembly in FIG. 2 will be identical to that illustrated in FIG. 1 and has therefore been omitted. However, the lower end of the sleeve or casing 66 surrounding the inner cooking vessel 18 in FIG. 2 is different. In FIG. 2, the transverse barrier plate is omitted, as are the openings for air flow into the burner area, which are not required for electrical heating. The lower end of the sleeve or casing it in two parts, with the inner, uppermost part of the sleeve 66 telescopically or slidably mounted on an outer surrounding sleeve or apron 70 which has an inturned flange or lip 72 at its upper end and an outwardly projecting flat flange or lip 74 at its lower end which is designed to rest on the flat stove top surface 60 surrounding an electrical heating element and burner recess. The part 66 of the casing also has an outwardly projecting retaining lip 75 at its lower end retaining apron 70 on the sleeve and also limiting the amount of relatively sliding movement between the parts to that indicated by the arrow 76 in FIG. 2. This allows for height adjustment of the cooking vessel for electrical elements of different heights. The cooking vessel and upper sleeve 66 will slide down relative to the outer apron until the base of the cooking vessel rests on the element, as illustrated in FIG. 2.

In the arrangement of FIG. 2, both the cooking vessel and the electric burner area are completely surrounded and insulated by the two part casing 66, 70. Hot air flow from the burner area will follow the direction of the arrow in FIG. 2 through the annular chamber between the side wall of the cooking vessel and the outer casing, and out through the clearance gap between the upper end of the casing and upper end of the inner cooking vessel, in the manner illustrated in FIG. 1. Again, heat loss as a result of the surrounding cold air will be reduced over a traditional, uninsulated saucepan, and energy savings of up to 25% may be achieved.

Figure 5:
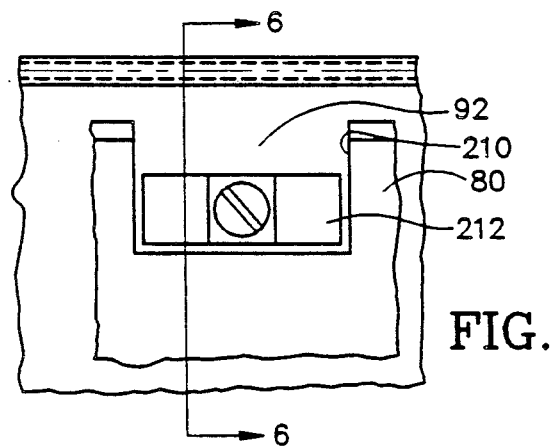
FIG. 5 is a side elevational view, partially broken away, illustrating a modification to the outer casing.
Figure 6:
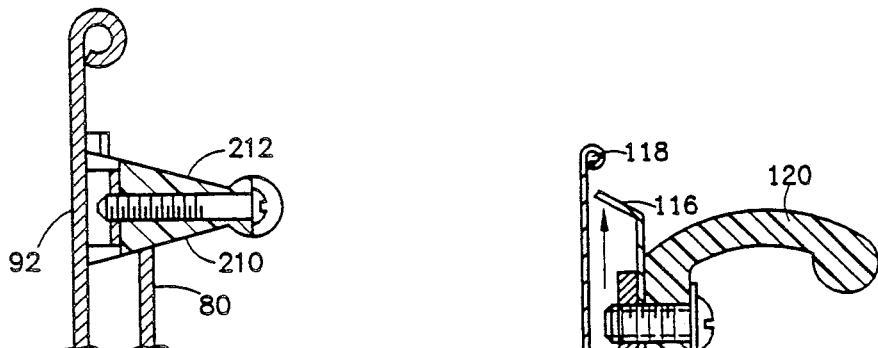
FIG. 6 is a cross-section on the lines 6—6 of FIG. 5.
Figure 7:
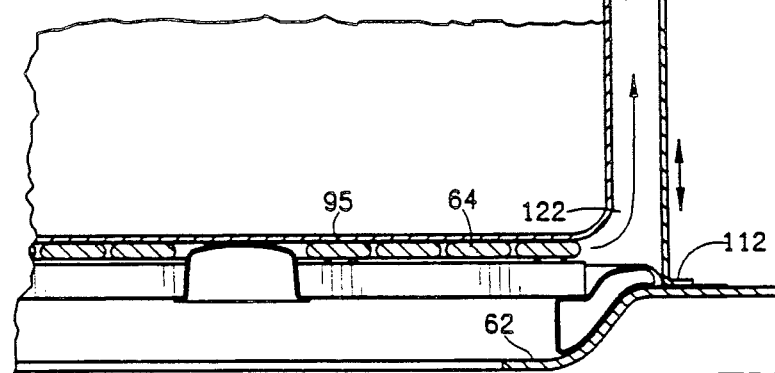
FIG. 7 illustrates a modification to the embodiment of FIG. 3 for use on an electric stove.

Although in the embodiments described above the saucepan or cooking vessel and outer casing are secured together to form a single cooking vessel assembly, separate casings may be provided for use with existing saucepans or stove top cooking vessels, as generally illustrated in the embodiments of FIGS. 3 to 7. FIGS. 3 to 6 illustrate casings for use on a gas stove, while FIG. 7 illustrates a modified casing for use on an electric stove.

Figure 3:
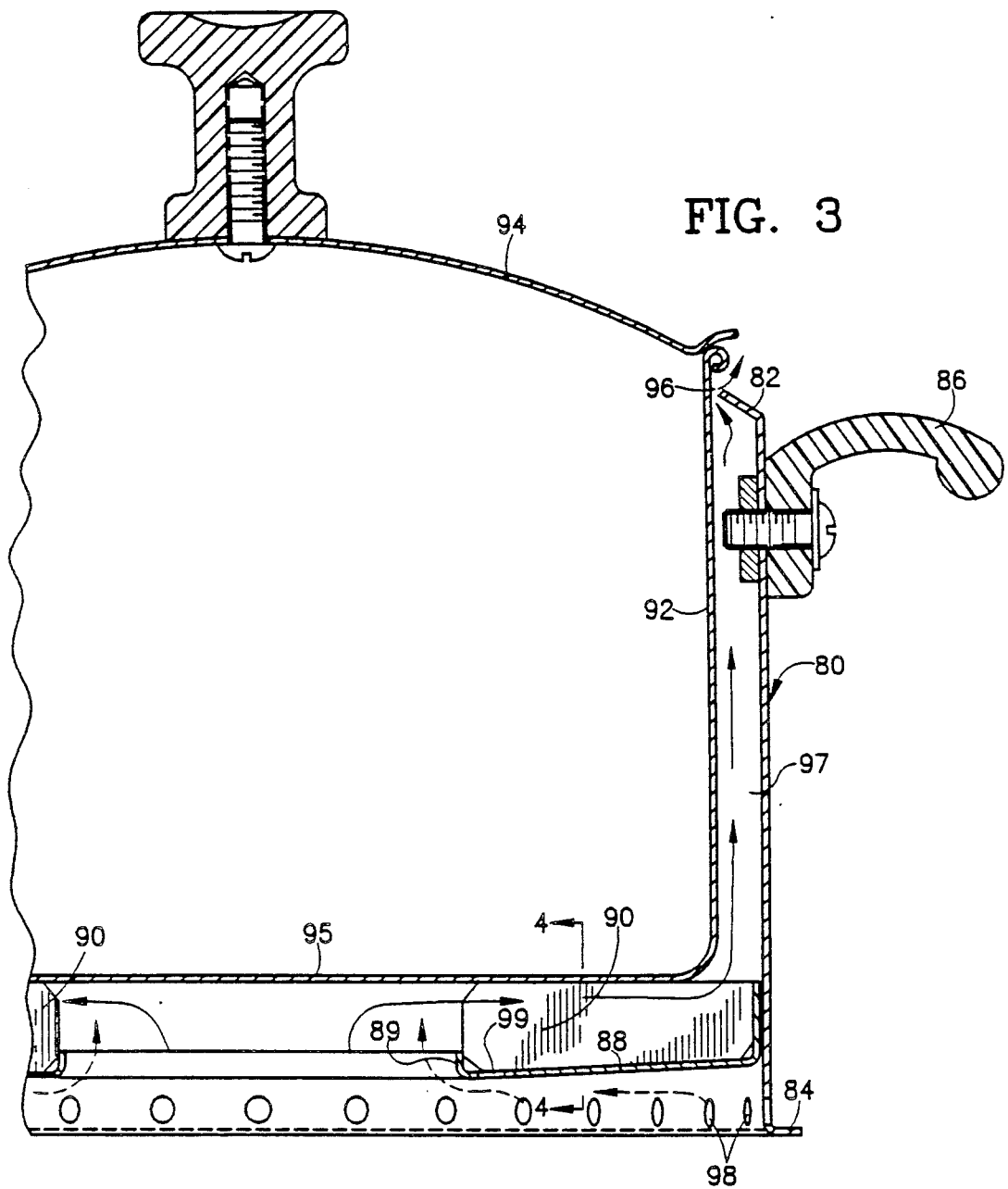
FIG. 3 is a view similar to FIG. 1 illustrating an energy conserving casing and separate cooking vessel according to another embodiment of the invention.
Figure 4:
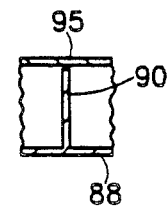
FIG. 4 is a cross-section on the lines 4—4 of FIG. 3.

Referring first to the energy conserving casing 80 for a gas stove as illustrated in FIGS. 3 and 4, this casing basically comprises a cylindrical sleeve having an inturned lip 82 at its upper end and an outwardly directed, flat lip or support flange 84 at its lower end for resting on the surface of a stove top surrounding a gas burner, in an equivalent manner to that illustrated in FIG. 1. The sleeve has a suitable handle 86 close to its upper end. A transverse barrier plate 88 extends across the inside of the sleeve at a location spaced above its lower end, and is suitably secured to the inner wall of the sleeve by welding or the like. The plate 88 has a central opening 89 of dimensions slightly larger than that of a gas burner, as in the previous embodiment. A series of three or four spaced, upstanding fins or flanges 90 extending radially from opening 89 are arranged around the plate 88, one of which can be seen in FIG. 4.

Instead of being secured to the sleeve, the inner cooking vessel 92, which may be an existing, conventional saucepan having a standard lid 94, is simply inserted into the open top of the casing until its base 95 rests on the upper edges of the support fins 90, as illustrated in FIG. 3. The outer casing may alternatively be provided with an opening, slot, or recess 210 as illustrated in FIGS. 5 and 6 for accommodating the existing saucepan handle 212. When the saucepan rests on the fins 90 as illustrated in FIG. 3, there will be a clearance 96 between the inner end of the inturned lip 82 of the surrounding casing and the adjacent outer surface of the saucepan, to allow air flow out of the annular chamber 97 between the outer surface of the vessel 92 and the inner surface of the surrounding sleeve 80. A series of spaced air inlet openings 98 are provided around the lower end of the casing below barrier plate 88, and a drainage hole 99 is provided in plate 88.

This assembly operates in an equivalent manner to the version illustrated in FIG. 1. Cold air for gas burning flows in through the openings 98 below the barrier plate, and hot gases from the burner flow through the central opening 89 in plate 88 and outwardly between the lower end of the saucepan and the barrier plate 88, which separates the hot gases from the incoming cold air. The hot gases then flow upwardly through the annular chamber 97 to heat the side walls of the saucepan, and out through clearance 96. This flow path is illustrated by the arrows in FIG. 3. Again, heat losses are substantially reduced since the entire outer surface of the saucepan or cooking vessel is surrounded and protected from the external, cold air by the outer casing, which also completely surrounds the heating area to increase the temperature of heating and avoid cooling of the heating element and cooking vessel by incoming cold air. This results in considerable energy savings and consequent reduction in fuel costs.

FIG. 7 illustrates a modification to the casing of FIGS. 3 and 4 for use on an electric stove rather than a gas stove. The electric stove casing 110 has no openings at its lower end. As in the other embodiments, an outwardly directed flat flange or annular foot 112 is provided at the open, lower end of the casing or sleeve 110 for resting on the surface of the stove surrounding an electric element recess 62. The casing has an inturned, inclined rim 116 at its open, upper end of diameter slightly less than the outer diameter of the rounded rim or lip 118 at the upper end of the side wall of conventional saucepan or cooking vessel 92. As in the embodiment illustrated in FIGS. 5 and 6, outer casing 110 is provided with a cut-out or recess 210 for receiving the existing handle 212 of conventional saucepan 92. The inner cooking vessel or saucepan 92 is simply inserted into the open top of casing 110 with its handle aligned with cut-out 212, until its lower end or base 95 rests on or close to the electric element 64. A suitable handle 120 is secured to the casing at an appropriate height.

As in the previous embodiments, the casing 110 completely surrounds the base and side wall of the cooking vessel or saucepan and forms an enclosed, insulated volume or chamber 122 around the entire heating element, insulating both the vessel itself as well as the burner area from the surrounding cold air and considerably increasing the efficiency of heating the cooking vessel, since hot gases rising from the burner area will be directed into the annular gap between the casing and side wall of the vessel.

In all of the embodiments described above, the cooking vessel was of saucepan-like shape and dimensions. Clearly, a range of outer casings for different saucepan dimensions may be provided, or a range of combined cooking vessels and surrounding casings in all the desirable saucepan sizes. In each case, the casing diameter is slightly larger than that of the stove top recess containing the gas burner or electric heater element, so that the lower end of the casing rests on the flat stove top and the casing completely surrounds both the cooking vessel and the burner or heating element area. At the same time, the casing is of larger diameter than that of the cooking vessel itself to leave an annular chamber for directing hot gases over the outer surface of the cooking vessel, producing a faster cooking time while reducing heat losses from the entire cooking area.

Figure 8:
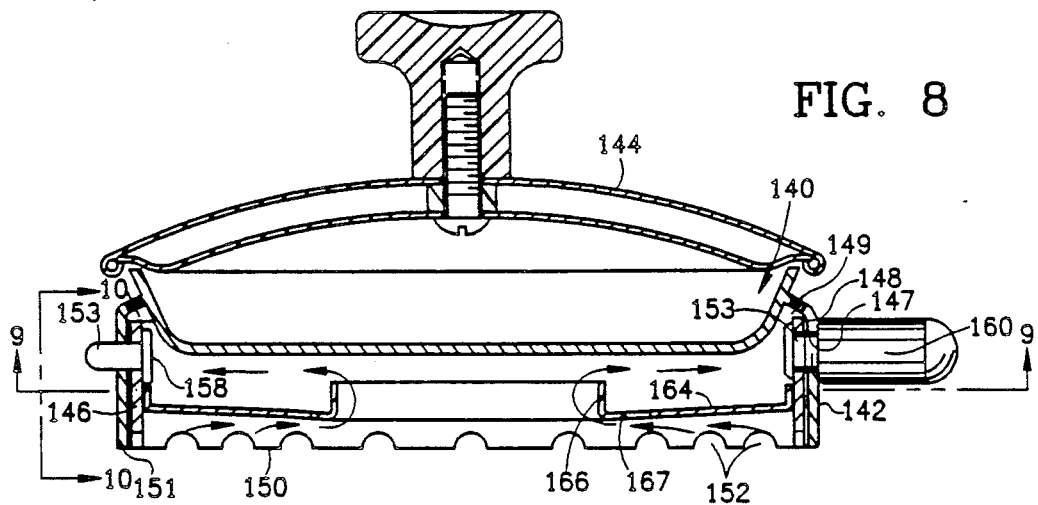
FIG. 8 illustrates a vertical cross-sectional view of a cooking vessel assembly according to another embodiment of the invention.
Figure 9:
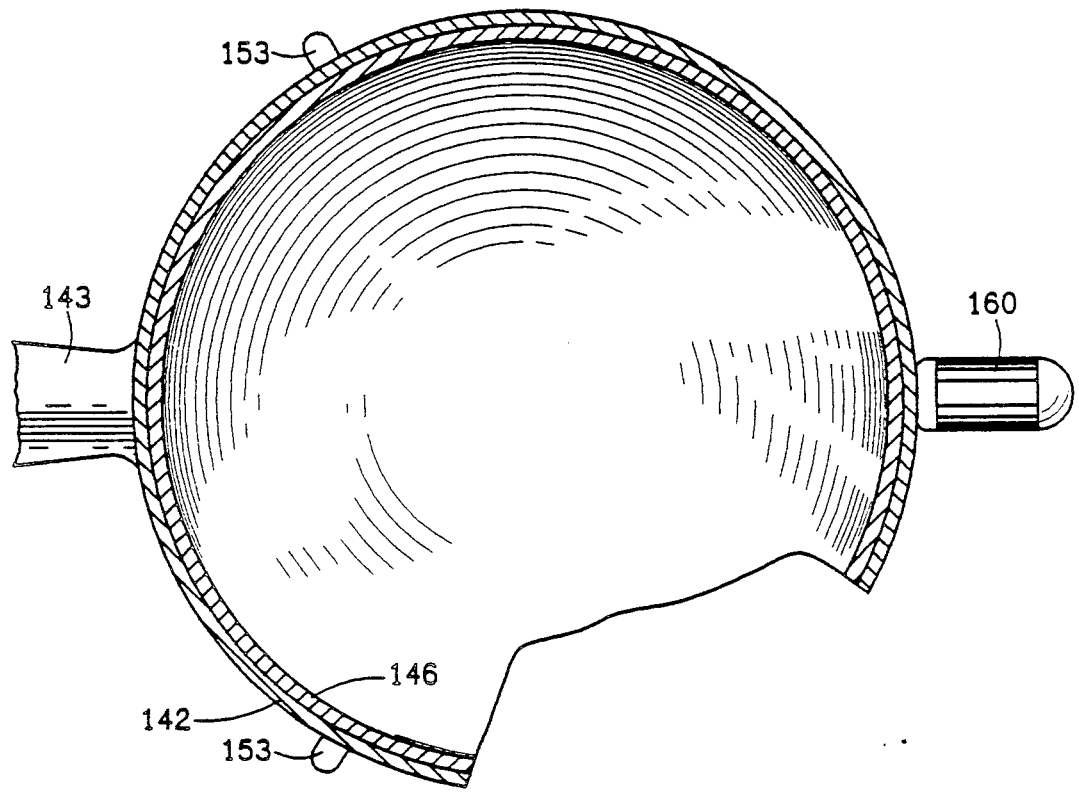
FIG. 9 is a horizontal cross-section on the lines 9—9 of FIG. 8, partially broken away.
Figure 10:
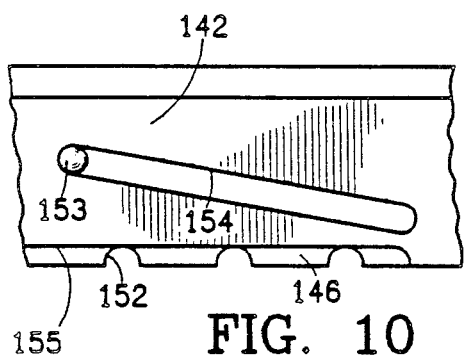
FIG. 10 is a view on the lines 10—10 of FIG. 8, illustrating a height adjustment slot.

FIGS. 8 to 10 of the drawings illustrate another embodiment of the invention comprising a frying-pan-like cooking vessel 140 having a downwardly depending skirt or sleeve 142 for surrounding a burner area, and a handle 143. The frying pan vessel 140 is shallow and of relatively large diameter, as is a conventional frying pan, and has a double walled, insulating lid 144. The skirt 142 extends downwardly from a location close to the upper end of the vessel 140, and is telescopically engaged over an inner, cylindrical sleeve or blind 146 which is open at its upper and lower ends 148, 150.

A series of indents or openings 152 are provided around the open lower end 150 of inner sleeve 146. Four spaced, elongated cut-outs 155 are provided around the open lower end of outer skirt 142. The outer skirt 142 is adjustably junctioned to the inner sleeve 146 via three spaced pins 153 (one of which is longer and has the thread for tightener member (or nut) 160) which project outwardly through openings 147 in inner sleeve 146 into elongated, downwardly inclined slots 154 in skirt 142, as illustrated in FIGS. 8 and 10. Clearly, the inclined slots 154 could alternatively be provided in sleeve 146. One of the pins 153 is elongated and has a threaded end for engaging a correspondingly threaded bore in tightener member or nut 160. The heads 158 of all of the pins are welded or otherwise secured to the inner surface of sleeve 146. The inner sleeve 146 has a transverse barrier plate 164 extending across its internal area at a location between its upper and lower ends, the plate 164 having a central opening 166 of dimensions slightly larger than those of a gas burner, and also having a drainage hole 167.

The adjustable connection between the inner sleeve and outer skirt allows the height of the base of the cooking vessel above the burner to be adjusted, simply by loosening clamp or tightener member 160 and rotating the outer skirt relative to the inner sleeve until the desired height is reached, at which point the member 160 is tightened to clamp the parts in the selected relative position. The assembly can be placed over a burner recess with the lower end of the inner sleeve resting on the flat surface of the stove surrounding the burner recess (not illustrated). The openings at the lower end of the inner sleeve 146 allow a limited amount of cold air to enter the burner area, as is required for gas burning, and the hot gases rising from the burner travel through the central opening in the plate and outwardly across the lower surface of the pan and around its side walls and at last out via openings 149 in the upper part of the skirt for efficient heating of the pan. The barrier plate or partition separates the incoming cold air from the hot gases. At the same time, the partition itself will be heated by the hot gases flowing over it, heating the incoming cold air traveling over its lower surface before arrival at the burner.

With this arrangement cooking in a frying-pan-like vessel is made more efficient since heat losses are reduced and the heating of the pan is more even, as compared to a conventional frying pan which is typically of much larger diameter than the burner so that the center or area of the base resting directly on the burner will be heated much faster. Thus, food in this part of a conventional pan may be burnt while food elsewhere is uncooked, unless stirred frequently. With the assembly an enclosed volume is provided around the entire lower surface of the pan and part of its side walls so that hot gases are directed over the entire area, providing more uniform heating and also reducing heat losses as a result of incoming hot air. Only the amount of air needed for combustion is allowed to enter via the openings, and this is heated by contact with the barrier plate and also separated from the hot gases rising from the burner by the same plate. Heating can also be controlled by raising or lowering the pan relative to sleeve 146.

Figure 11:
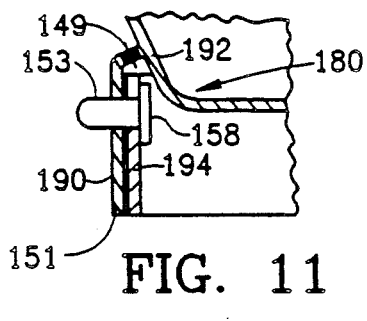
FIG. 11 is a partial view similar to part of FIG. 8 illustrating a modification to the embodiment of FIG. 8 for use on an electric stove.

FIG. 11 illustrates a modified frying pan assembly 180 for use on an electric stove. The arrangement is similar to that in FIGS. 8 and 10, except that both the barrier plate 164 and the inlet openings 152 are eliminated. As in the previous embodiment, the pan has a downwardly depending annular skirt 190 projecting from its side wall 192, and an internal sleeve 194 adjustably mounted inside the annular skirt for height adjustment of the pan 192 over the electric burner. The height adjustment mechanism is identical to that described above in connection with the previous embodiment, with pins 153 projecting outwardly through openings in the inner sleeve 194 into inclined slots (not visible) in the outer skirt 190, and a similar clamping or tightening member is secured to one of the pins for locking the parts in the desired position. This provides an enclosed volume beneath the pan and surrounding the heating element, increasing the temperature beneath substantially the entire cooking surface of the pan and significantly decreasing the cooking time while reducing energy losses. The heating will be more uniform, and can also be controlled by raising or lowering the pan, reducing the risk of burning the food.

Figure 12:
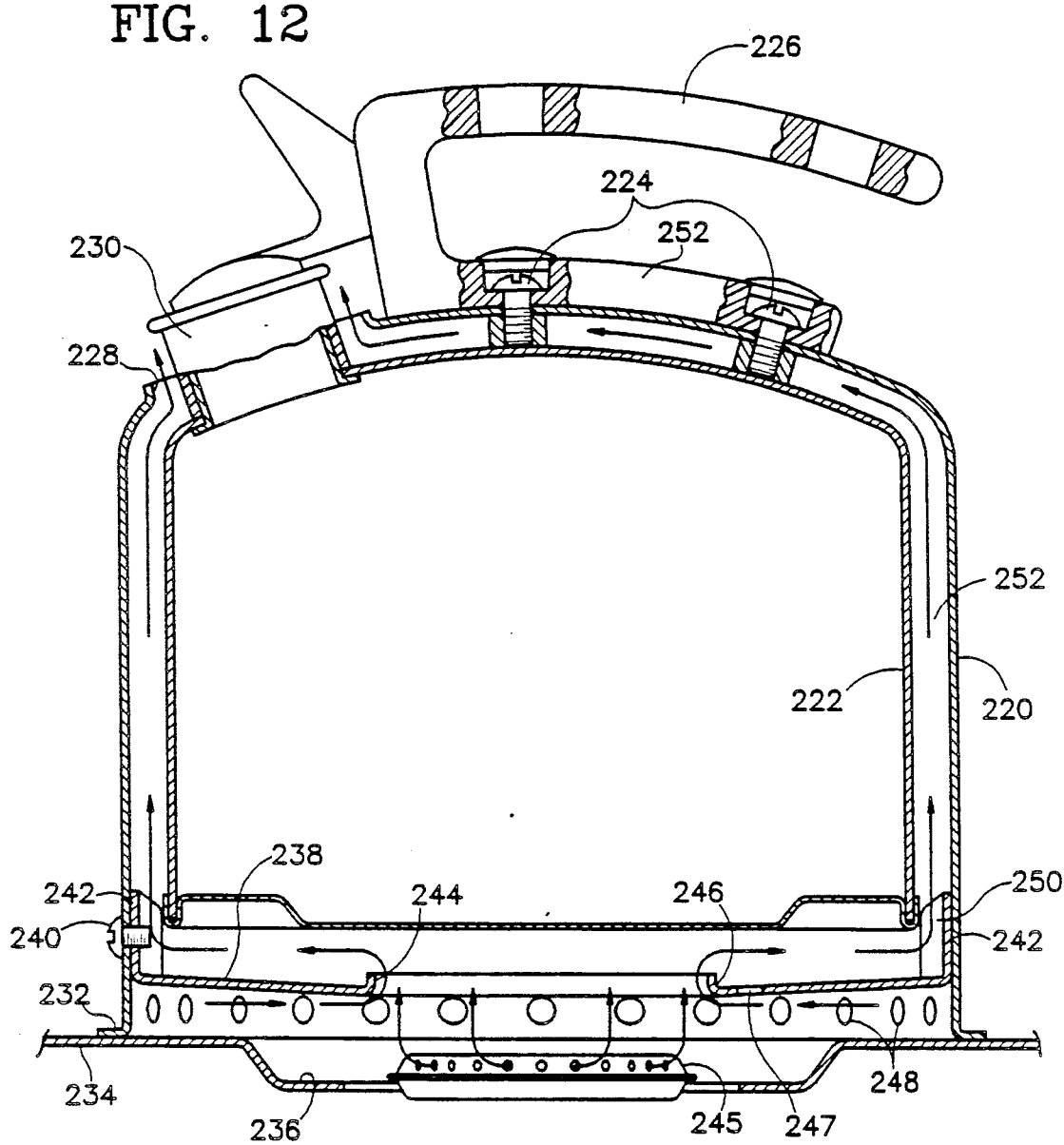
FIG. 12 is a vertical cross-sectional view of a cooking vessel assembly according to another embodiment of the invention.

FIG. 12 illustrates another embodiment of the invention in which an energy conserving casing 220 is designed for use with a tea kettle type of vessel 222 for boiling water. In the embodiment illustrated in FIG. 12, the casing is designed for use on a gas stove. However, it will be understood that the casing may be modified in a similar manner to the previous embodiments for use with an electric stove.

In the embodiment illustrated in FIG. 12, the inner, tea kettle vessel 222 is of a standard shape and is secured to the outer casing 220 which is of equivalent shape but larger dimensions, and substantially surrounds the outer periphery of the kettle 222 via screws 224, which also secure a suitable handle 226 to the casing. The casing has an opening 228 through which the pouring spout 230 of the kettle projects. Casing 220 has an outwardly projecting seating flange or lip 232 at its lower end for resting on the flat stove top 234 surrounding burner recess 236. A transverse barrier plate 238 extends across the open lower end of the casing at a location spaced below the base of kettle 222 and above the lower end of casing 220. The barrier plate is secured by welding, screw fasteners 240, or the like around its outer periphery to the inner surface of casing 220 at an appropriate location, and has an upturned outer rim or flange 242 for this purpose. Where screws 240 are used to secure the plate to the casing, the kettle can easily be removed when necessary simply by releasing screws 224 and 240. A central opening 244 of larger dimensions than burner 245 is provided in the barrier plate. The barrier plate has an upturned rim 246 surrounding the opening 244, and one or more drainage holes 247 are provided in the plate 238.

Casing 220 has a plurality of air inlet openings 248 spaced around its outer periphery below the level of barrier plate 238 for entry of air to the burner area. A series of three or four spaced fins 250 are welded to the upturned lip 242 of barrier plate 238 and extend radially inwardly a short distance to engage the lower end of vessel 222 and to center the vessel in the casing.

With this arrangement, the outer surface of kettle 222 is more or less completely insulated from the surrounding air, since the outer casing extends over both the sides and top surface of the kettle 222. This forms a protected volume 252 between the outer surface of kettle 222 and the inner surface of casing 220, which extends down to the stove top area and surrounds the burner. The casing acts to direct hot air in the direction of the arrows in FIG. 12, up through the opening 244 in baffle plate 238, outwardly between plate 238 and the base of the kettle 222, and upwardly before flowing out through opening 228. As in the previous embodiments, the gas stove burner area is also protected from the surrounding cold air, since the casing entirely surrounds this area, effectively increasing the temperature of burning and the hot gas temperature, and allowing no hot gas to escape from the burner area without flowing over the surface of the kettle first. This significantly reduces heat losses from the burner area and from the surface of the kettle itself, resulting in a reduction in heating time and consequent energy savings. Additionally, the barrier plate acts to separate incoming cold air from the flow of hot gases from the burner, substantially reducing any mixing of cold air with the hot gases and further reducing energy losses. The heating of the barrier plate by the hot gases flowing over it will pre-heat the incoming cold air to a certain extent, increasing burning efficiency and further reducing energy losses.

The casing 220 of FIG. 12 may be modified for use on an electric stove in an equivalent manner to that illustrated in FIG. 2. In the case of a casing for a kettle, the upper part of the casing will be identical to that illustrated in FIG. 12 for enclosing a kettle, but the barrier plate 238 will be omitted, as in FIG. 2, and the lowermost part of the casing 220 will be in two parts 66, 70 as in FIG. 2, the inner, uppermost part being telescopically, slidably mounted on an outer surrounding apron which seats on the stove top. In this alternative embodiment, fins similar to centering fins 250 in FIG. 12 will be provided on the inner surface of the innermost part of casing 220 for centering the kettle.

Figure 13:
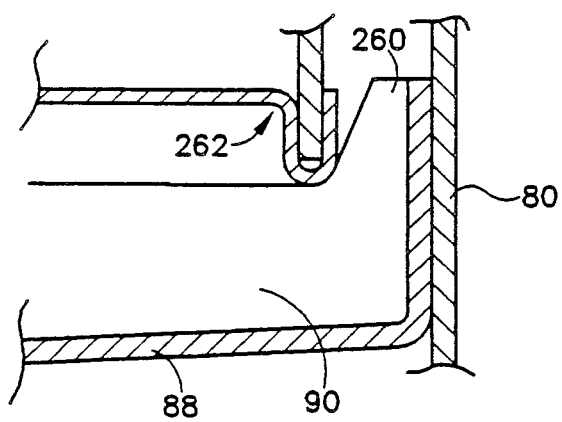
FIG. 13 illustrates a modification to the lower end of the casing in FIG. 3 for use with a separate kettle.

In the embodiment of FIG. 12, the kettle and casing are positively secured together. However, it will be understood that a similar casing may be provided for use with an existing, separate kettle on a gas stove in a similar manner to that illustrated in FIG. 3 for a separate saucepan. In this case, the casing will be more or less identical to casing 80 illustrated in FIG. 3, but dimensioned to slidably receive a kettle for resting on fins 90, rather than saucepan 92. Preferably, the support fins 90 are provided with upwardly slanted outer end portions 260 which act to center the lower end 262 of a kettle over the burner head, as illustrated in FIG. 13. A casing similar to that illustrated in FIG. 7 may alternatively be used for surrounding an existing kettle on an electric stove. In this case, the casing will be more or less identical to that illustrated in FIG. 7 but dimensioned to slidably receive a kettle, with suitable spacer fins (not illustrated) on the inner surface of the casing acting in an equivalent manner to the fins 250 in FIG. 12 to center the kettle as it is inserted into the casing. In this way, existing conventional tea kettles can be used either on gas or electric stoves in a similar manner to the existing saucepans of FIGS. 3 and 7, simply by inserting them into the open tops of suitable energy conserving casings which will be substantially identical to casings 80, 110 respectively apart from the centering fins.

In all of the embodiments described above, cooking times are substantially reduced and energy is saved, with substantial reduction in fuel costs, by the provision of an enclosed volume around the cooking vessel which extends down to the surface of the stove surrounding the burner area. Not only is heat directed around the entire lower surface and at least part of the side walls of the vessel, but the temperature is raised by the enclosed volume or chamber separating the burner or heating element area from the surrounding cold air. The source of energy (the gas stove burner or the heating element of an electric stove) and the area around the energy source is completely enclosed and isolated from the surrounding cold air. This increases the temperature of burning in the case of a gas stove, as well as the temperature of the hot gas surrounding the cooking vessel. The design takes into consideration different burner or heater element sizes and positions on different stove designs, since the outer sleeve will surround the entire burner or heater element recess regardless of the design of the actual burner or heater element. Both the cooking vessel and the burning or heating zone beneath the cooking vessel are completely surrounded and isolated from the surrounding cold air, with only the amount of air needed for burning in the case of a gas stove allowed to enter the enclosed volume, in the manner of a carburetor or firing chamber. The casing is suitably of similar metal to that used for saucepans and frying pans.

The assembly is relatively simple and requires a minimum of parts while providing significant energy savings. Manufacture will be inexpensive, and use of the assembly either with existing vessels as in FIGS. 3 to 7, or with a built-in vessel as in FIGS. 1, 2 and 8 to 12, will not complicate the cooking process. The casing may be designed for any type of cooking or stove top vessel, such as saucepans, casseroles, frying pans, tea kettles and the like as used on stove tops.

Although some preferred embodiments of the invention have been described above by way of example only, it will be understood by those skilled in the field that modifications may be made to the disclosed embodiments without departing from the scope of the invention, which is defined by the appended claims.

I claim:

1. A heating vessel assembly, comprising:
   an inner receptacle for receiving material to be heated, the inner receptacle having a base and upstanding side walls;
   an outer cylindrical casing of larger diameter than the receptacle surrounding the side walls of the receptacle to leave an annular gap between the walls of the casing and receptacle, the casing being open at its lower end, the lower end being of larger diameter than a burner recess on a stove top and including seating means at its lower end for seating on the upper surface of a stove top surrounding and spaced from the outer periphery of a recess for a burner on the stove top, the lower part of the casing surrounding the space between the bottom of the receptacle and the surface of the stove top to form an enclosed volume surrounding the burner;
   support means on said casing for supporting said inner receptacle with its base spaced above the open lower end of said casing; and
   said casing having openings spaced around its outer periphery adjacent its lower end for connecting the interior of the lower end of the casing to the air surrounding the outside of the casing for access of air to the burner.

2. The assembly as claimed in claim 1, wherein the inner receptacle is separate from said outer casing, said support means comprising inwardly projecting rest means on said outer casing for forming a rest for freely supporting said inner receptacle.

3. The assembly as claimed in claim 1, wherein said inner receptacle is secured to said outer casing.

4. The assembly as claimed in claim 1, including handle means projecting outwardly from said outer casing for gripping by a user to lift said assembly.

5. The assembly as claimed in claim 1, wherein the casing is a unitary member having barrier means extending transversely across the open lower end of the casing at a location spaced above said seating means and below the base of said inner receptacle, the barrier means having a central opening only for alignment with a gas burner, the casing openings being spaced around its periphery below said barrier means for air flow into the burner area.

6. The assembly as claimed in claim 1, including adjustment means for adjusting the height of said inner receptacle relative to said casing.

7. The assembly as claimed in claim 1, wherein said inner receptacle is a frying pan.

8. The assembly as claimed in claim 1, wherein said inner receptacle is a saucepan.

9. The assembly as claimed in claim 1, wherein said inner receptacle is a tea kettle.

10. The assembly as claimed in claim 9, wherein said outer casing includes an upper wall portion extending across the top of the tea kettle, the tea kettle having a pouring spout and the upper wall of the casing having an opening through which said pouring spout projects.

11. A heating vessel assembly, comprising:
    an inner receptacle for receiving material to be heated, the inner receptacle having a base and upstanding side walls;
    an outer cylindrical casing of larger diameter than the receptacle surrounding the side walls of the receptacle to leave an annular gap between the walls of the casing and receptacle, the casing being open at its lower end, the lower end being of larger diameter than a heating element recess on a stove top and including seating means at its lower end for seating on the upper surface of a stove top surrounding a heating element on the stove top to form an enclosed volume surrounding the heating element; and said casing comprising two separate telescopically connected upper and lower cylindrical parts which are freely slidable relative to one another between fully extended and fully retracted positions, the lower part having said seating means at its lower end for seating on the upper surface of a stove top surrounding a heating element and the inner receptacle being secured to the upper telescoping part, said telescopic connection between said parts allowing said inner receptacle to slide downwardly relative to said lower part to seat directly on said heating element.

12. An energy conserving casing for a stove top vessel, comprising:
   a cylindrical sleeve of diameter larger than that of a predetermined stove top vessel for surrounding the vessel to leave an annular enclosed volume between the side walls of the vessel and the sleeve;
   the sleeve having downwardly depending skirt means at its lower end for extending downwardly from the lower end of a vessel located within the sleeve to form an enclosed volume below the vessel;
   said skirt means having seating means at its lower end for seating on the upper surface of a stove surrounding a burner; and
   a transverse barrier plate extending transversely across the interior of said sleeve adjacent and spaced above its lower end, the plate having a central opening for alignment with a burner, the sleeve having a series of spaced air inlet openings around its outer periphery exposed to the air outside the casing below the level of said barrier plate for connecting the interior of the sleeve directly to the air surrounding the exterior of the casing.

13. The casing as claimed in claim 12, wherein said barrier plate has spaced, upstanding radial ribs on its upper surface comprising said support means for supporting the bottom wall of a cooking vessel in said sleeve.

14. The casing as claimed in claim 12, wherein said sleeve has an inturned rim extending around its open upper end of diameter larger than the dimensions of a vessel to be contained within the sleeve.

15. The casing as claimed in claim 12, further including securing means for securing said sleeve to a cooking vessel within said sleeve.

16. The casing as claimed in claim 12, wherein said sleeve comprises two separate, telescopically connected parts which are freely slidable relative to one another between predetermined fully extended and retracted positions.

17. The casing as claimed in claim 12, wherein said sleeve includes spaced, inwardly projecting centering means for centering a vessel contained within said sleeve.

18. The casing as claimed in claim 17, wherein said centering means comprise radially inwardly projecting fins.

19. The casing as claimed in claim 12, wherein the upper end of the sleeve has at least one downwardly extending recess for receiving a radially projecting handle on a vessel within said sleeve.

20. A cooking vessel assembly, comprising:
   an inner receptacle for receiving material to be heated, the receptacle having a base and upstanding side walls; and
   an outer cylindrical sleeve extending downwardly from a predetermined height on the side walls and having an open lower end, said lower end including seating means for seating on the upper surface of a stove top surrounding an electric or gas burner recess, said sleeve comprising means for forming an enclosed volume surrounding the side walls of said receptacle and extending below the base of said receptacle down to the surface of a stove top;
   said sleeve comprising separate inner and outer parts and adjustable securing means between said inner and outer parts, said adjustable securing means comprising at least one pin projecting from one of the members, the other member having an elongate, inclined slot for receiving said pin.

21. The assembly as claimed in claim 20, wherein said inner receptacle is a shallow pan.

* * * * *